(12) United States Patent
Richins et al.

(10) Patent No.: US 8,894,345 B1
(45) Date of Patent: Nov. 25, 2014

(54) MULTI-FUNCTIONAL VEHICULAR RAMP

(76) Inventors: Steve Richins, Thermopolis, WY (US); Val Stephens, Hyde Park, UT (US); Alayne Vicars, Hyde Park, UT (US)

(*) Notice: Subject to any disclaimer, the term of this patent is extended or adjusted under 35 U.S.C. 154(b) by 734 days.

(21) Appl. No.: 13/198,333

(22) Filed: Aug. 4, 2011

(51) Int. Cl.
*B60P 1/43* (2006.01)

(52) U.S. Cl.
USPC .................................................. 414/537

(58) Field of Classification Search
CPC .......... B60P 1/43; B60P 1/431; B60P 3/1025; B60P 3/40; A61G 3/061; B60R 9/06; B60R 9/10; B62D 33/0273
USPC .......................................... 414/462, 537, 921
See application file for complete search history.

(56) References Cited

U.S. PATENT DOCUMENTS

| | | | |
|---|---|---|---|
| 3,025,985 A | 3/1962 | Crawford | |
| 3,201,144 A | 8/1965 | Smyser | |
| 3,613,920 A | 10/1971 | Flamm | |
| 3,704,794 A | 12/1972 | Flamm | |
| 4,761,847 A | 8/1988 | Savage et al. | |
| 4,795,304 A | 1/1989 | Dudley | |
| 4,874,284 A | 10/1989 | New, Jr. | |
| 5,342,105 A | 8/1994 | Miles | |
| D360,729 S | 7/1995 | Collins | |
| 5,494,393 A | 2/1996 | Schrunk | |
| 5,553,762 A | 9/1996 | Brown | |
| 5,879,123 A | 3/1999 | Blaikie | |
| 6,076,215 A | 6/2000 | Blankenship et al. | |
| 6,371,719 B1 | 4/2002 | Hildebrandt | |
| 6,386,819 B1 | 5/2002 | Schultz | |
| 6,524,055 B1 * | 2/2003 | Overbye | 414/537 |
| 6,533,337 B1 * | 3/2003 | Harshman et al. | 296/26.08 |
| 6,536,064 B1 | 3/2003 | Swink et al. | |
| 6,536,822 B1 | 3/2003 | Vagedes et al. | |
| 6,543,985 B1 | 4/2003 | Harstad et al. | |
| 6,705,820 B2 | 3/2004 | Schilling | |
| 6,769,583 B1 | 8/2004 | Gordon et al. | |
| 7,243,966 B1 | 7/2007 | Sheldon | |
| 7,309,202 B1 * | 12/2007 | Anderson | 414/537 |
| 2004/0126215 A1 * | 7/2004 | Long | 414/537 |
| 2009/0123259 A1 | 5/2009 | Barclay | |
| 2010/0025955 A1 | 2/2010 | Carr, Jr. | |

* cited by examiner

*Primary Examiner* — Saul Rodriguez
*Assistant Examiner* — Emery Hassan
(74) *Attorney, Agent, or Firm* — Kyle A. Fletcher, Esq.

(57) ABSTRACT

The multi-functional vehicular ramp is an accessory that attaches to a trailer hitch of a pickup truck and which include foldable ramp members that fold down to enable ATVs or other wheeled objects to drive up onto a bed of a pickup truck for transport, and wherein the foldable ramp members can fold up to secure said wheeled object to said pickup truck bed. The multi-functional vehicular ramp can also adapt to attach wheels thereon for use as a trailer to be towed via one of a multitude of adaptors behind a truck or other motor-powered vehicle. The multi-functional vehicular ramp may also be adaptively used to suspend an object above the ground by extending the foldable ramp members upwardly and connection there between via a suspension member. The multi-functional vehicular ramp may also adapt for use as a workbench or as a picnic table.

15 Claims, 17 Drawing Sheets

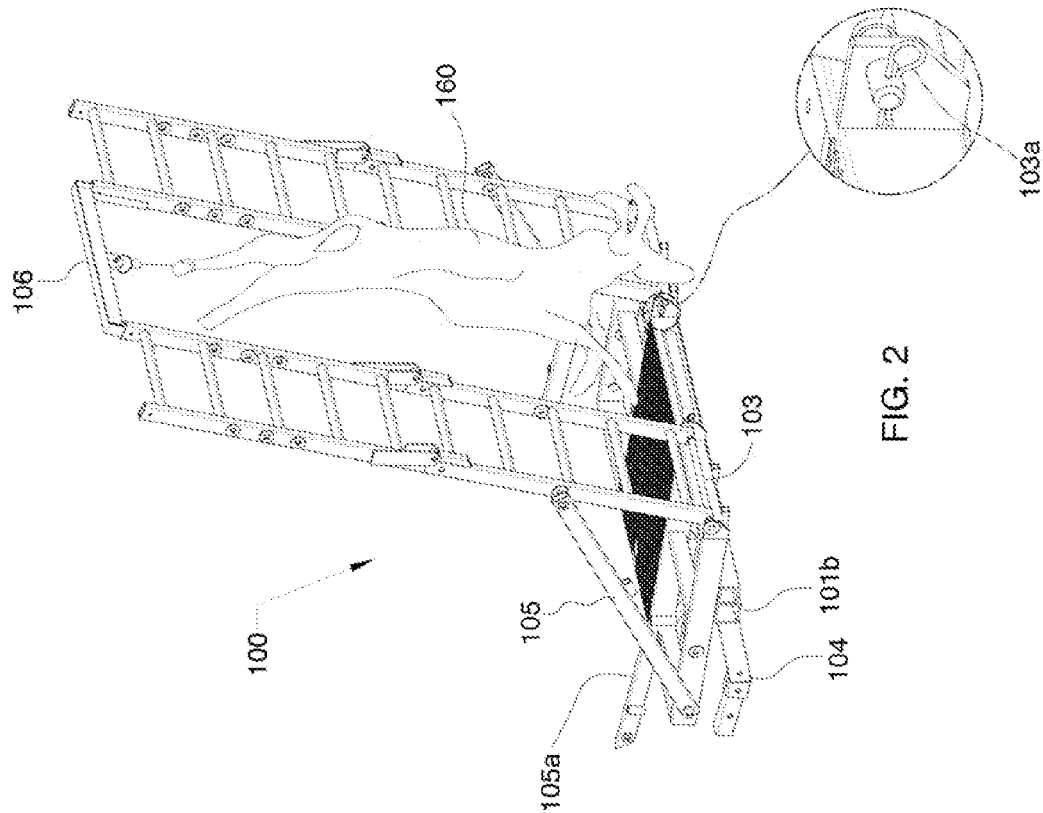
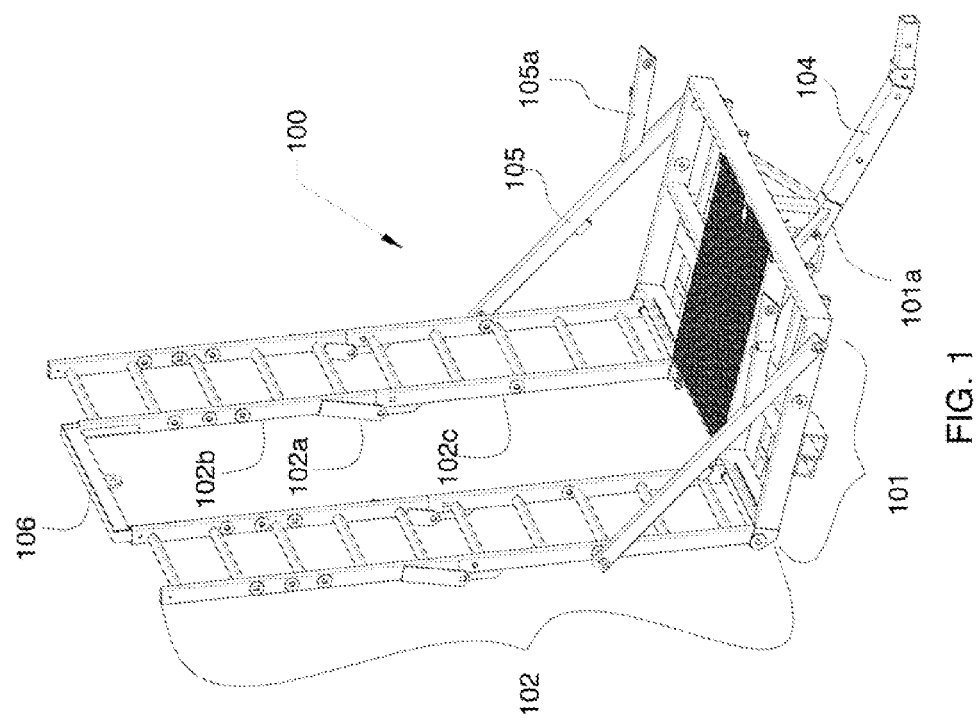

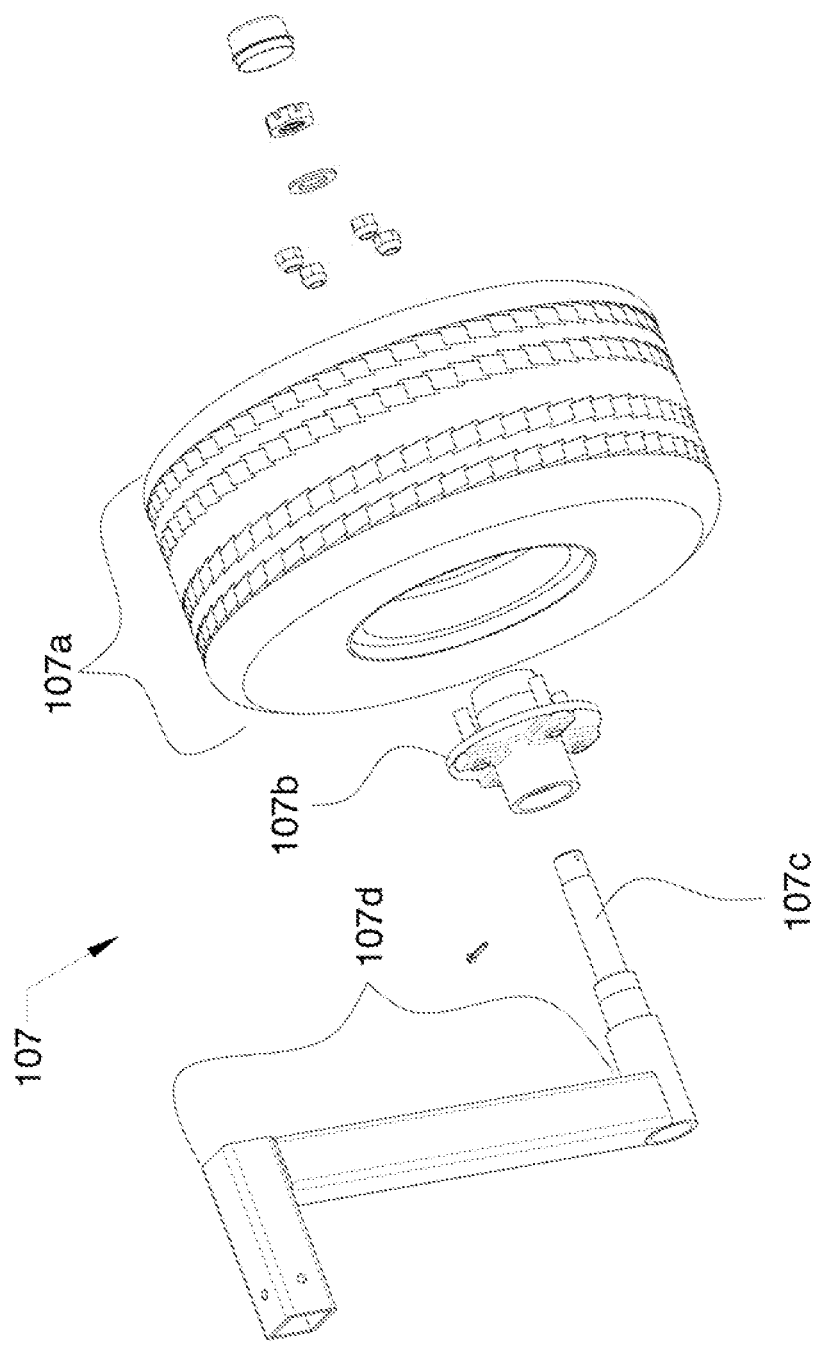

MULTI-FUNCTIONAL VEHICULAR RAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of vehicular ramps, more specifically, a vehicular ramp that can be adaptively engaged for use as a trailer, a stand, a game supporting apparatus, or a picnic table.

B. Discussion of the Prior Art

As a preliminary note, it should be stated that there is an ample amount of prior art that deals with vehicular ramps. As will be discussed immediately below, no prior art discloses a vehicular ramp that is suited for use with a pickup truck, and which can enable an all-terrain vehicle to drive onto the rear of said pickup truck, but which can be adaptively used for other uses comprising a trailer, a stand, a picnic table, a game supporting apparatus.

The Vagedes et al. Patent (U.S. Pat. No. 6,536,822) using the cargo bed expander. However, the ramp and cargo bed expander cannot modify for use as a trailer for different types of vehicles or a means of suspending an object such as killed game or as a picnic table.

The Schultz Patent (U.S. Pat. No. 6,386,819) discloses a self-powered elevationally-adjustable foldable ramp for draft vehicles. However, the foldable ramp does not include removable wheels and interchangeable trailer tongues so as to adapt for use as a trailer for different types of vehicles, or of which adapts for use as a picnic table or a means of suspending an object in the air, such as a killed game.

The Gordon et al. Patent (U.S. Pat. No. 6,769,583) teaches a carrier apparatus and method that involves a ramp that attaches to the trailer hitch of a pickup truck. However, the apparatus utilizes different construction such that the ramp is supported about half of the length, no supporting posts fold down when in use, and a separate flat deck must be folded onto the tailgate when in use.

The Schilling Patent (U.S. Pat. No. 6,705,820) teaches a carrier lift apparatus for loading and unloading an all terrain vehicle onto a pickup truck bed, which involves a recessed platform that is mounted on the pickup truck bed. However, the carrier lift apparatus occupies the truck bed when the truck is not transporting an all terrain vehicle, as opposed to a device that attaches to the trailer hitch of a truck.

The New, Jr. Patent (U.S. Pat. No. 4,874,284) teaches a kit for adapting a pickup truck for safely loading, transporting, and unloading two all terrain vehicles over the truck's bed while preserving cargo space in the bed area. However, the kit loads the all-terrain vehicles from the side of the pickup bed, and does not connect to the trailer hitch of a pickup truck.

The Savage et al. Patent (U.S. Pat. No. 4,761,847) teaches a portable, folding ramp that extends down from the tailgate of a pickup truck. However, the folding ramp does not connect to the trailer hitch, and include a horizontal track that extends out far enough from the tailgate such that the tailgate can be opened and closed while the invention is attached.

The Hildebrandt Patent (U.S. Pat. No. 6,371,719) teaches a recreational vehicle carrier for use with a pickup truck. As with the New Patent, the all terrain vehicles are loaded from the side of the pickup bed, as opposed to the rear.

The Blaikie Patent (U.S. Pat. No. 5,879,123) teaches a vehicle loading and transport attachment that includes a ramp assembly. However, the ramp assembly does not extend from the trailer hitch of the truck, but is rather mounted to the loading deck that is atop the truck bed.

The Flamm Patents (U.S. Pat. Nos. 3,613,920 and 3,704,794) teach a support deck that is selectively mountable with a pickup truck bed. Again, the ramp extends from a loading dock that is mounted to the truck bed, as opposed to an assemblage that extends from the trailer hitch of the pickup truck.

The Schrunk Patent (U.S. Pat. No. 5,494,393) teaches an all terrain vehicle carrier apparatus for a pickup truck. However, the all terrain vehicles are loaded via ramps that extend from the side of the pickup truck bed as opposed to the end of the pickup truck bed.

The Brown Patent (U.S. Pat. No. 5,553,762) teaches a vehicle carrier and ramp assembly for transporting an all terrain vehicle in a pickup truck bed. However, the ramp assembly is mounted to a deck that is mounted atop a truck bed.

While the above-described devices fulfill their respective and particular objects and requirements, they do not describe a vehicular ramp that is suited for use with a pickup truck, and which can enable an all-terrain vehicle to drive onto the rear of said pickup truck, but which can be adaptively used for other uses comprising a trailer, a stand, a picnic table, a game supporting apparatus. In this regard, the multi-functional vehicular ramp departs from the conventional concepts and designs of the prior art.

SUMMARY OF THE INVENTION

The multi-functional vehicular ramp is an accessory that attaches to a trailer hitch of a pickup truck and which include foldable ramp members that fold down to enable ATVs or other wheeled objects to drive up onto a bed of a pickup truck for transport, and wherein the foldable ramp members can fold up to secure said wheeled object to said pickup truck bed. The multi-functional vehicular ramp can also adapt to attach wheels thereon for use as a trailer to be towed via one of a multitude of adaptors behind a truck or other motor-powered vehicle. The multi-functional vehicular ramp may also be adaptively used to suspend an object above the ground by extending the foldable ramp members upwardly and connection there between via a suspension member. The multi-functional vehicular ramp may also adapt for use as a workbench or as a picnic table.

a vehicular ramp that is suited for use with a, pickup truck, and which can enable an all-terrain vehicle to drive onto the rear of said pickup truck, but which can be adaptively used for other uses comprising a trailer, a stand, a picnic table, a game supporting apparatus An object of the invention is to provide a multi-functional vehicular ramp that attaches to a trailer hitch of a truck and which supports itself thereon, and which can fold ramp members up and down to enable an ATV or wheeled object to be driven up and onto the bed of the pickup truck and subsequently stored thereon for transport.

A further object of the invention is to provide a multi-functional vehicular ramp that can adapt for use as a means of suspending an object above ground, and which may be used to support the carcass of a dead animal there from.

A further object of the invention is to provide a multi-functional vehicular ramp that can adaptively include wheeled members to the vehicular ramp and which can work as a trailer that may be towed by a truck, an ATV, or other motor-powered wheeled object.

An even further object of the invention is multi-functional vehicular ramp that can adapt for use as a workbench or as a picnic table.

These together with additional objects, features and advantages of the multi-functional vehicular ramp will be readily apparent to those of ordinary skill in the art upon reading the following detailed description of presently preferred, but nonetheless illustrative, embodiments of the multi-functional vehicular ramp when taken in conjunction with the accompanying drawings.

In this respect, before explaining the current embodiments of the multi-functional vehicular ramp in detail, it is to be understood that the multi-functional vehicular ramp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multi-functional vehicular ramp.

It is therefore important that the claims be regarded as including such equivalent construction insofar as they do not depart from the spirit and scope of the multi-functional vehicular ramp. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a front, perspective view of the multi-functional vehicular ramp by itself and in which the foldable ramp members are extended vertically and connected there between via a suspension member;

FIG. 2 illustrates a rear, perspective view of the multi-functional vehicular ramp by itself and in which the carcass of an animal is suspended above ground via the suspension member;

FIG. 16 illustrates perspective views of the wheel assemblies that attach to the multi-functional vehicular ramp in order to modify the structure for use as a trailer;

DETAILED DESCRIPTION OF THE EMBODIMENT

Figure 4:
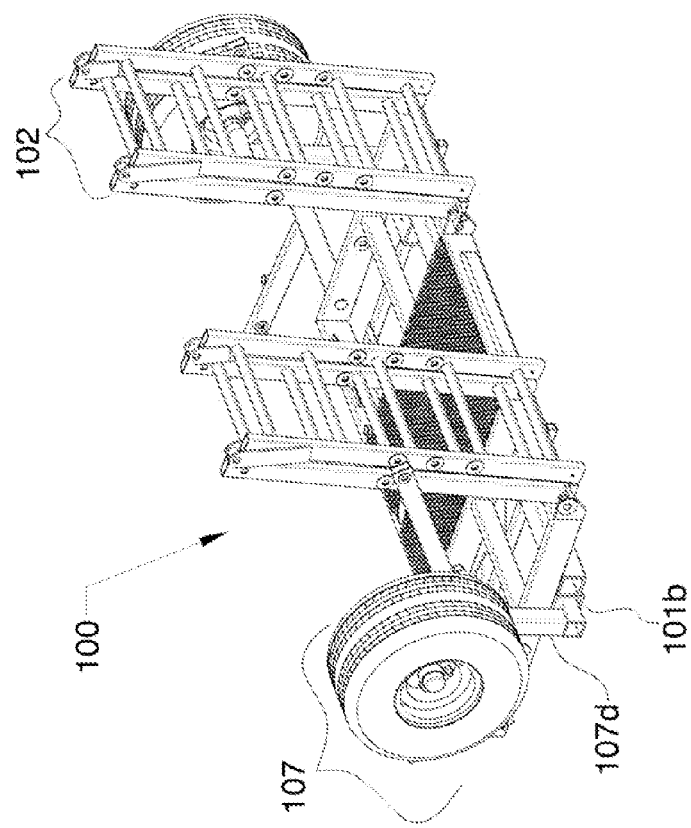
FIG. 4 illustrates a rear, perspective view of the multi-functional vehicular ramp as adapted for use as a trailer.
Figure 3:
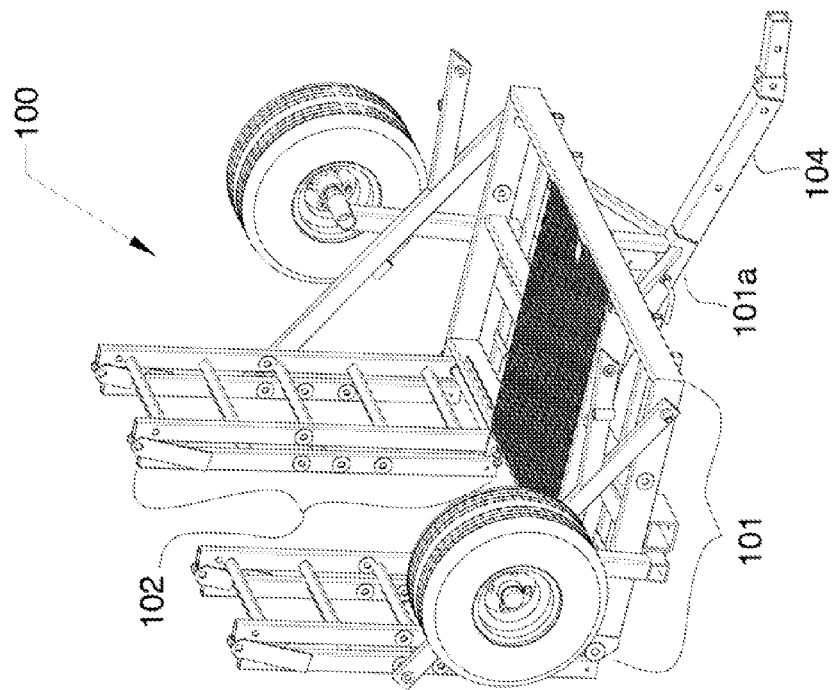
FIG. 3 illustrates a front, perspective view of the multi-functional vehicular ramp in which wheels are added thereon along with an adaptor for use as a trailer.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-21. A multi-functional vehicular ramp 100 (hereinafter invention) includes a base frame 101 from which foldable ramp members 102 attach to and extend.

The foldable ramp members 102 are generally parallel with respect to one another and provide a means to enable a wheeled object 140 (depicted as an ATV) to drive upon the base frame 101. The foldable ramp members 102 each include a locking hinge 102A that enables rotation of a first member 102B with respect to a second member 102C. The locking hinge 102A ensures that the foldable ramp member 102 can lock in an extended position as depicted in FIGS. 1, 2, 9-12, and 18.

Both the first member 102B and the second member 102C each have rungs 102D that are equally spaced, and which form a structure resembling a ladder.

As previously mentioned, the foldable ramp members 102 attach to the base frame 101 via a rod 103 and cotter pin 103A. However, it shall be noted that the foldable ramp members 102 may be disconnected from the base frame 101 and put aside when not needed.

The base frame 101 includes an angled hitch member 101A that extends from below the base frame 101 at an angle, and which is used to attach the invention 100 to different types of vehicles in different capacities. In the main function of the invention 100, the base frame 101 attaches to a trailer hitch invention 100 includes an adaptor 104, which may involve different shapes and sizes depending upon the particular application of the invention 100. More particularly, different styled and sized pickup trucks 130 have different geometries that require differently-shaped adaptors 104. The adaptor 104 is provided as a means of securely attaching the invention 100 to the trailer socket 131.

Attached on opposing sides of the base frame 101 are support posts 105. The support posts 105 are rotatably engaged ID with respect to the base frame 101, and provide support when needed to either the base frame 101 and/or the foldable ramp members 102. The support posts 105 each feature an angled member 105A that extends from the support post 105 to form a "Y" shape. The support posts 105 each attach to the base frame 101 via support rods 105B and cotter pins 105C.

The rods 105B and the cotter pins 105C enable the support posts 105 to attach to the base frame 101 and to the foldable ramp members 102 individually or collectively at unique angles formed there between (refer to FIGS. 1-13). The support posts 105 can be used to support the foldable ramp members 102 at an inclined angle with respect to the base frame 101 (see FIGS. 1-5, and 11-13); whereas the support posts 105 may be used to support the base frame 101 at a horizontal position with respect to the ground and/or adjacent the pickup truck 130.

The invention 100 includes a cross-brace 106 that attaches to opposing first members 102A of the foldable ramp members 102. The cross-brace 106 enables an object 160 to be suspended above the ground (see FIG. 2). It is often desirable to hang the carcass of a dead animal after a hunting expedition. The inclusion of the cross-brace 106 accommodates this need. The cross-brace 106 may be used with the invention 100 when configured for use as a vehicular ramp (see FIGS. 1-2), but may also be used when the invention 100 is configured for use as a trailer, which will be discussed below.

The invention 100 includes wheel assemblies 107 attach to opposing sides of the base frame 101 and enable the invention 100 to be used as a trailer. The base frame 101 includes a lateral member 101B, which enable attachment of the wheel assemblies 107 thereon. The wheel assemblies 107 each include a wheel 107A rotating hub 107B, axle 107C, and adaptor 107D. The wheel assemblies 107 employ the adaptor 107D to attach to the base frame 101 at the lateral member 101B.

Figure 5:
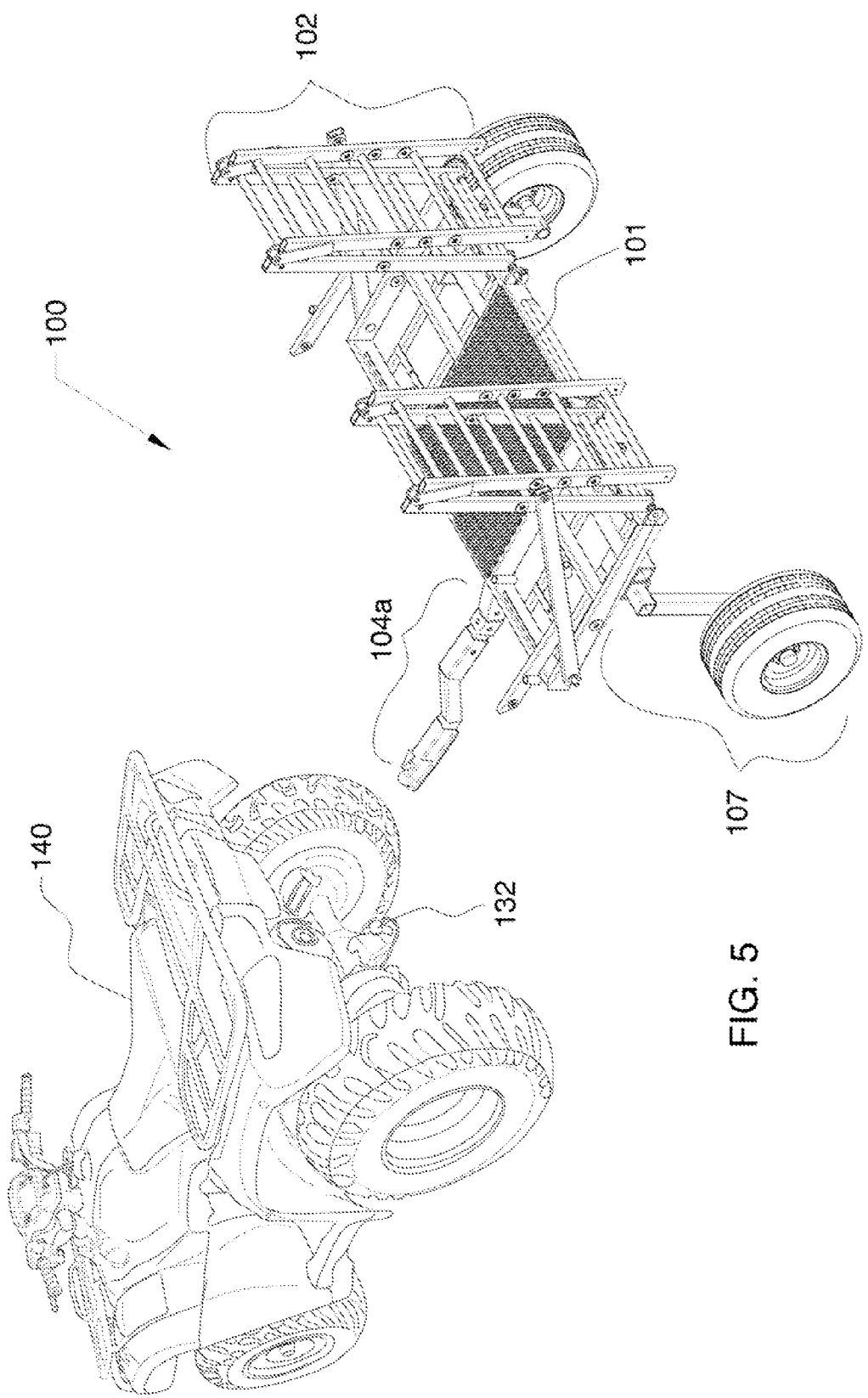
FIG. 5 illustrates a top, perspective view of the multi-functional vehicular ramp as adapted for use as a trailer in which an adaptor is used to attach the trailer to a trailer hitch ball of a vehicle.

Referring to FIG. 5, the invention 100 is adapted for use as a trailer in which a second adaptor 104A attaches to the angled hitch member 101A of the base frame 101. The second adaptor 104A is analogous to a trailer hitch commonly used on boat trailers, and require the use of a trailer hitch ball 132 on the pickup truck 130. However, the second adaptor 104A may also be modified for use in attachment to the wheeled object 140 (ATV) when so used as a trailer.

Figure 6:
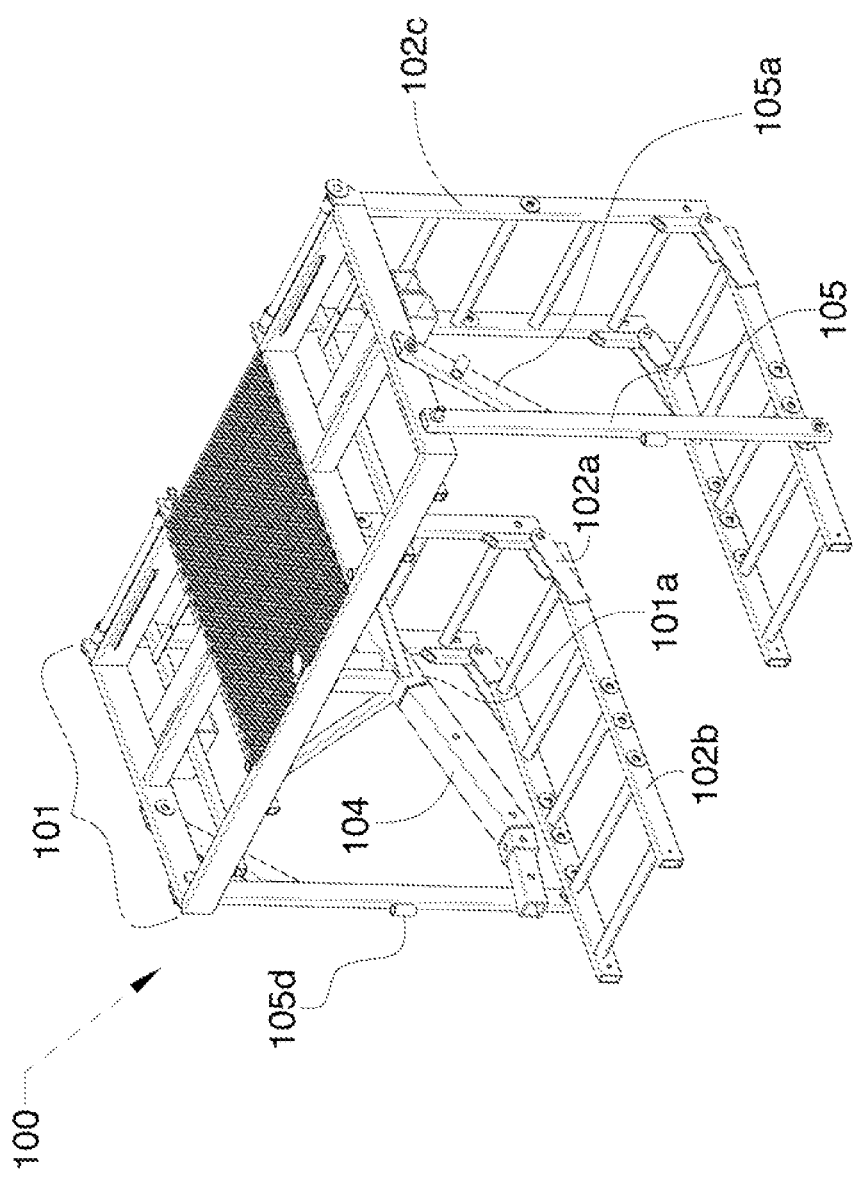
FIG. 6 is a perspective view of the multi-functional vehicular ramp in a workbench configuration in which the foldable ramp members are rotated under in order to store the multi-functional vehicular ramp between uses, and also to act as a workbench.

Referring to FIG. 6, the invention 100 may be adapted for use as a bench, and can self-support the base frame 101 in between uses as either a trailer or as a ramp for use with the back of the pickup truck 130. It shall be noted that the support posts 105 are vertically oriented and attached to the base frame 101 at two locations so as to provide enough support for at least the weight of the base frame 101. Upon attachment of the adaptor 104 to the trailer hitch socket 131 of the pickup truck 130, the support posts 105 may or may not be temporarily removed, depending upon the use of the invention 100.

Figure 7:
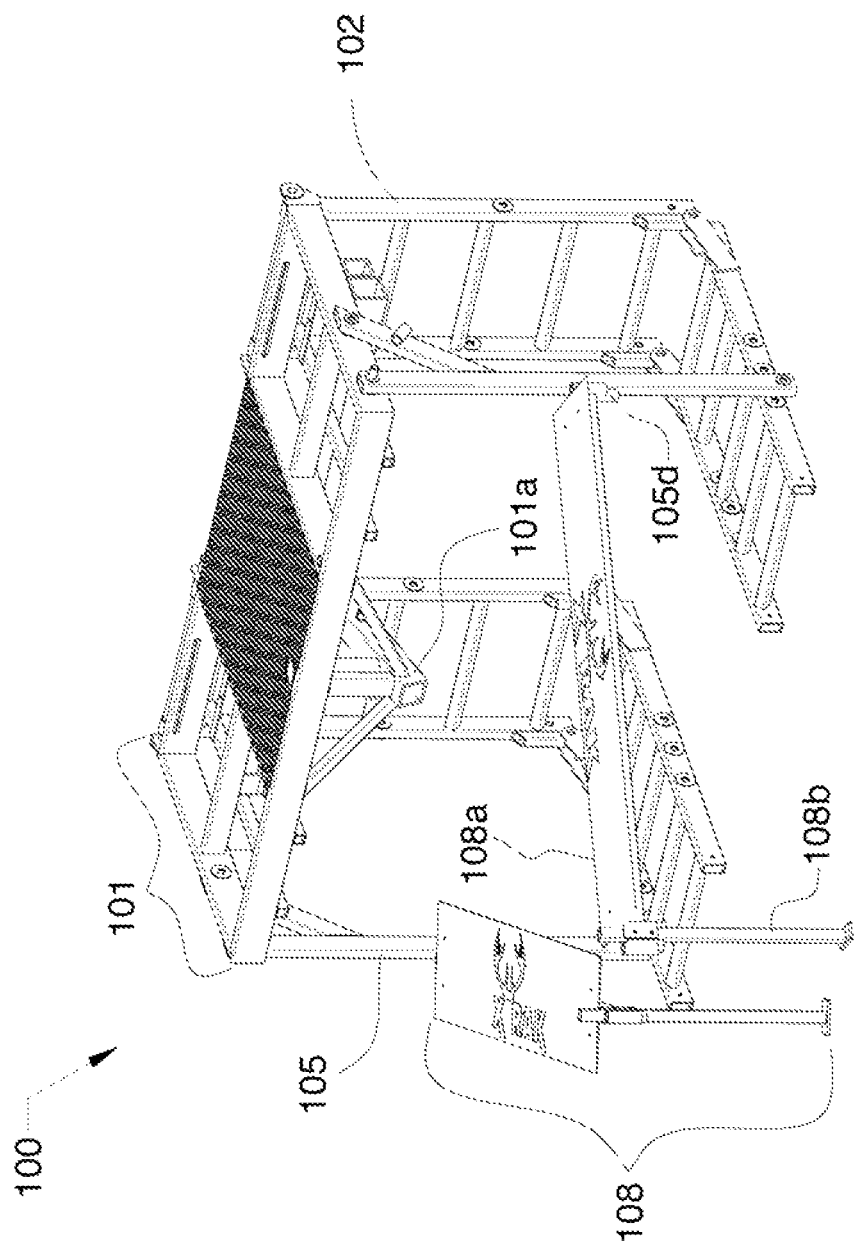
FIG. 7 illustrates a perspective view of the multi-functional vehicular ramp adapted for use as a picnic table in which the benches extend from opposing ends of the device.
Figure 8:
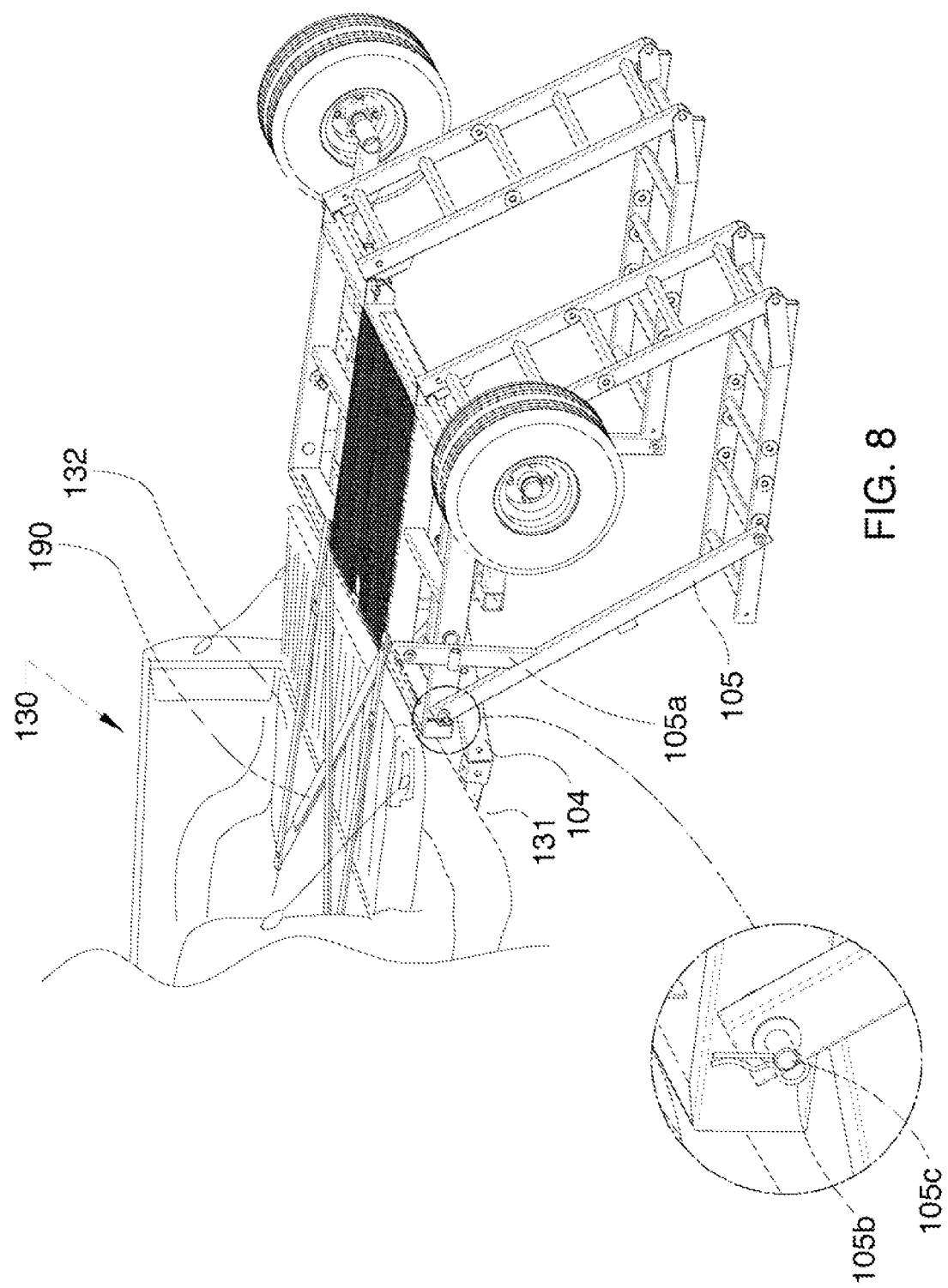
FIG. 8 illustrates a perspective view of the multi-functional vehicular ramp attached to a trailer hitch of a pickup truck in which the gate of the pickup truck is folded down.
Figure 9:
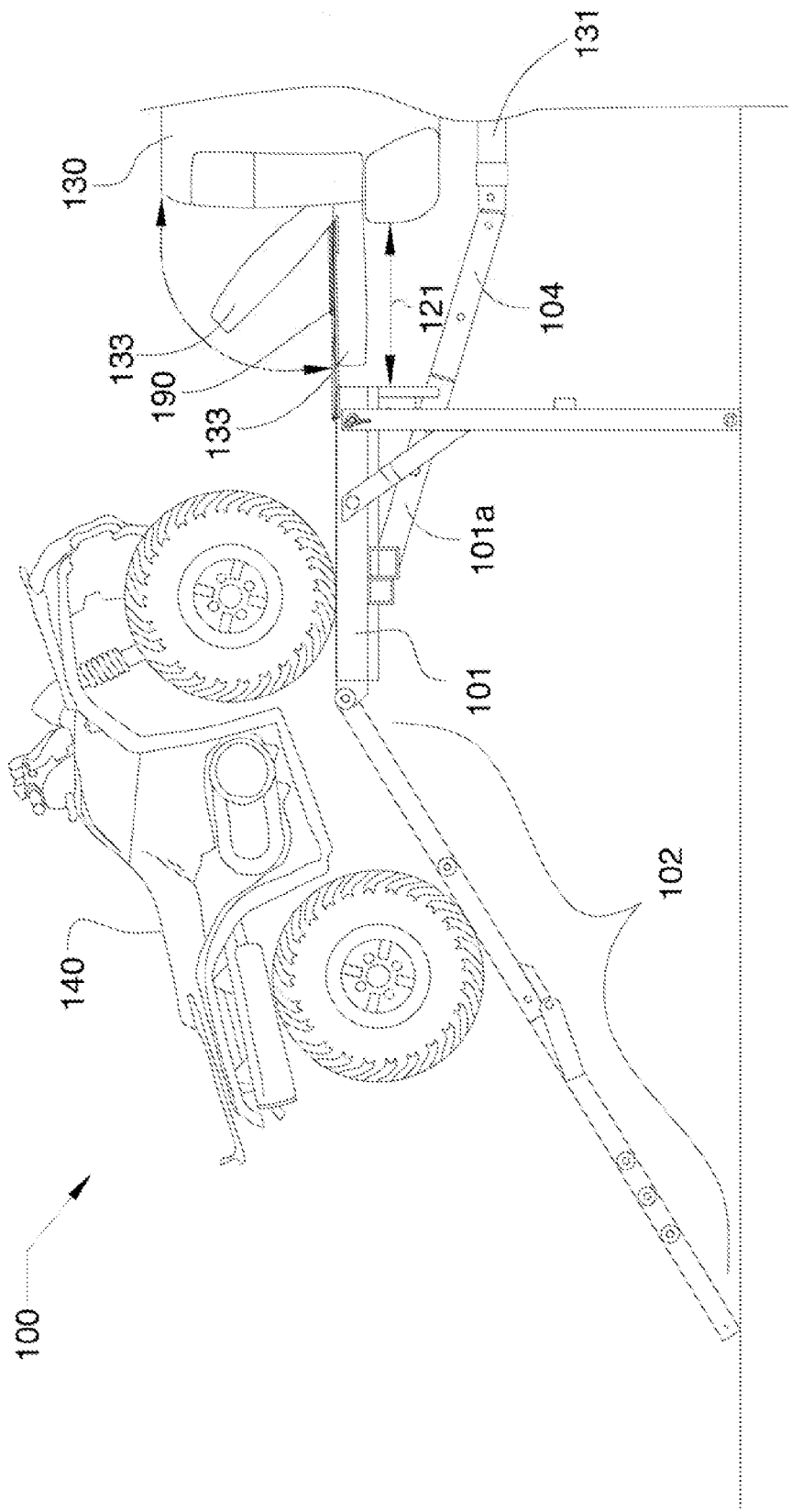
FIG. 9 illustrates a side view of the multi-functional vehicular ramp attached to the trailer hitch of a pickup truck and in which the foldable ramp members are rotated down to enable an ATV to drive thereon while detailing rotation of the gate of the pickup truck thereby providing clearance therein.
Figure 10:
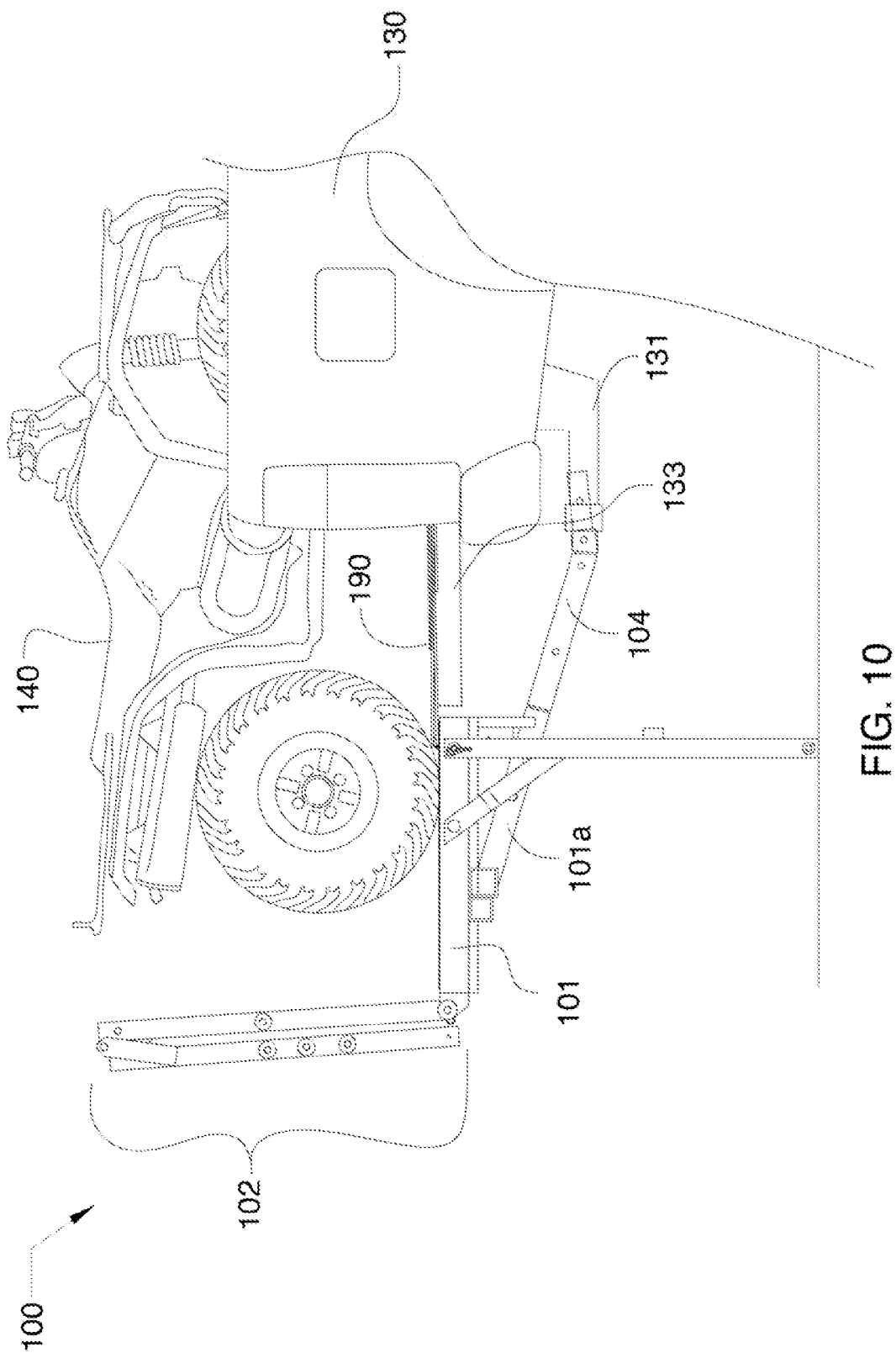
FIG. 10 illustrates a side view of the multi-functional vehicular ramp in which the ATV is driven atop both the multi-functional vehicular ramp and the pickup truck bed while depicting the foldable ramp members retracted.
Figure 11:
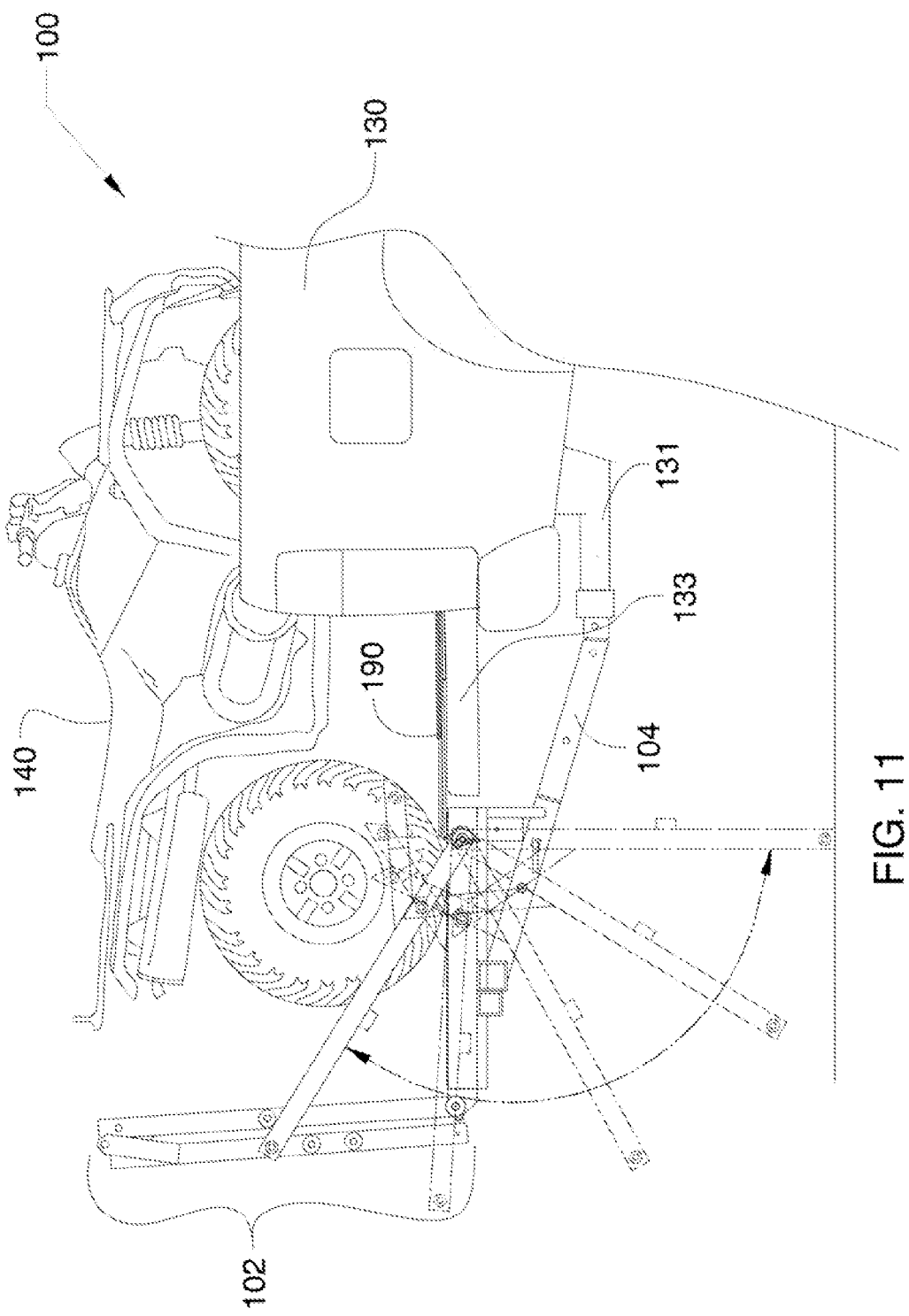
FIG. 11 illustrates a side view of the multi-functional vehicular ramp in which the support posts are rotated to support the foldable ramp members in a retracted position.
Figure 12:
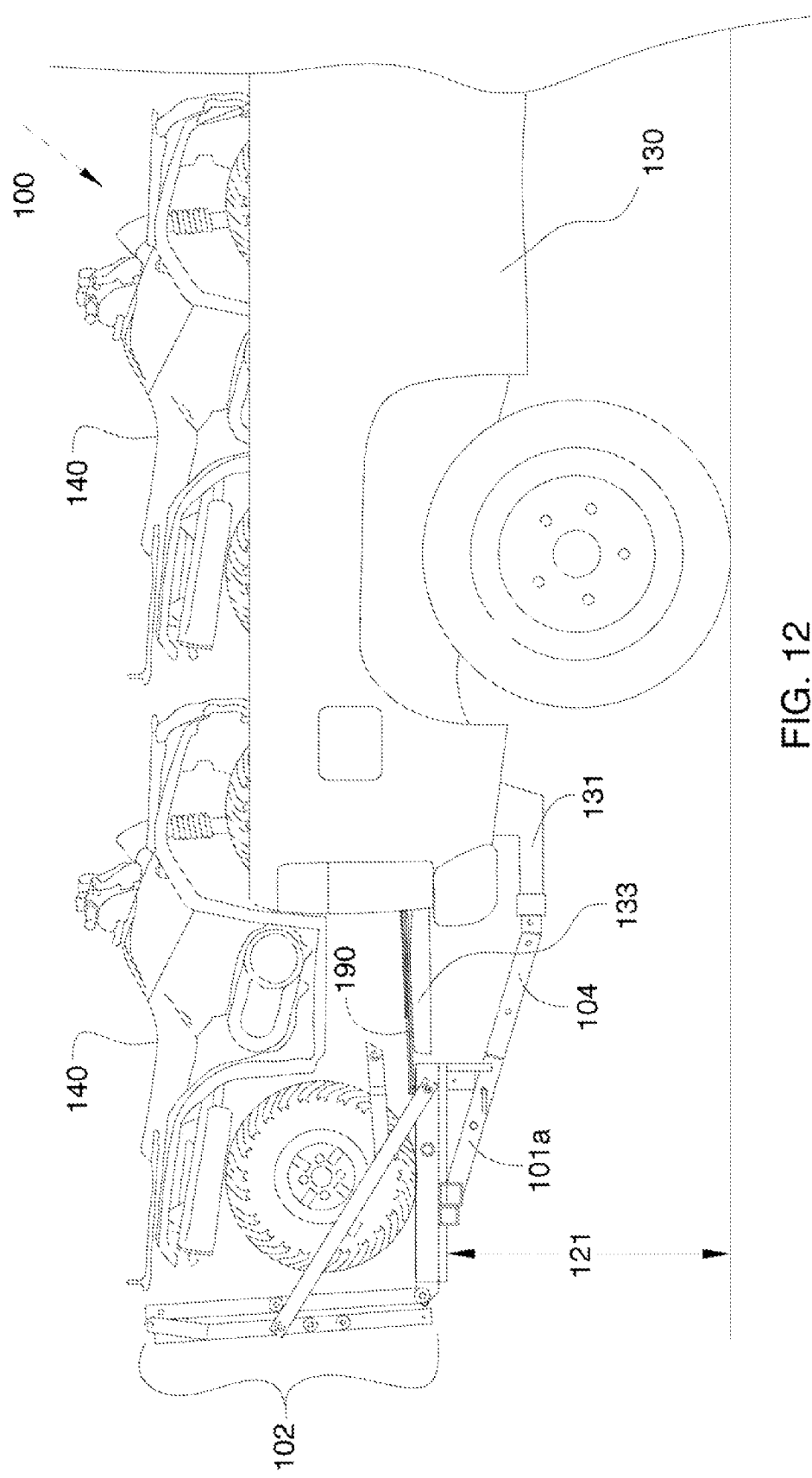
FIG. 12 illustrates a side view of the multi-functional vehicular ramp in which two ATVs are consecutively parked atop both the pickup truck bed and the multi-functional vehicular ramp.

Referring to FIG. 7, the invention 100 may be modified for use as a picnic table, and in which case may require removal of the adaptor 104. Referring to both FIGS. 7 and 19, bench members 108 may be attached to the support posts 105 via brackets 105D. The bench members 108 each include a horizontal seating surface 108A along with a vertical support member 108B that is located on an end of the horizontal seating surface 108A opposite of where the bench member 108 attaches to the bracket 105D of the support post 105. The vertical support member 108B can be adjustably engaged with respect to the horizontal seating surface 108A so as to accommodate different elevational applications.

Referring to FIGS. 8-12, the invention 100 is ideally suited for use as a ramp for the attached pickup truck 130. In more particular terms, the invention 100 provides a foldable ramp upon which a wheeled object 140 may drive upon a bed 132 of a pickup truck 130 for transport. It shall be further noted that the invention 100 may act as a ramp for different types of wheeled objects 140, and depicts an ATV, but may further comprise go-carts, dirt bikes, motorcycles, bicycles, etc.

The attachment of the invention 100 via the adaptor 104 to the trailer hitch socket 131 of the pickup truck 130 provides clearance in the form of a gap 120 between the base frame 101 and the pickup truck 130. The gap 120 is primarily to accommodate a tailgate 133 when rotated down. The tailgate 133 is capable of full rotation (see FIG. 9). The invention 100 may be used to only provide a ramp for driving the wheeled object 140 onto the truck bed 133, and thereafter the invention 100 may be removed, and the tailgate 134 folded up to transport the wheeled object 140 loaded on the truck bed 133.

It shall be noted that the adaptor 104 also supports the base frame 101 and the invention 100 at an elevation 121 that is equal to the elevation of the truck bed 132, and the tailgate 133 when folded down.

The invention 100 may include straps 190 that connect along a front edge of the base frame 101, and extend into the truck bed 132. The straps 190 may form a criss-cross pattern, and extend into the truck bed 132 in order to provide additional support for the invention 100 regardless of whether the support posts 105 are touching the ground.

However, the invention 100 may stay connected to the trailer hitch socket 133 provide the support posts 105 are folded upwardly and free of impact with the surrounding ground. More specifically, the support posts 105 are rotated in order to support the foldable ramp members 102 in a retracted position (see FIG. 11). It shall be noted that if the invention 100 remains connected to the trailer hitch socket 131, the invention 100 may be referred to as a truck bed extension, which elongates the applicable area of the truck bed 133 as illustrated by storing two wheeled objects 140 thereon.

Figure 13:
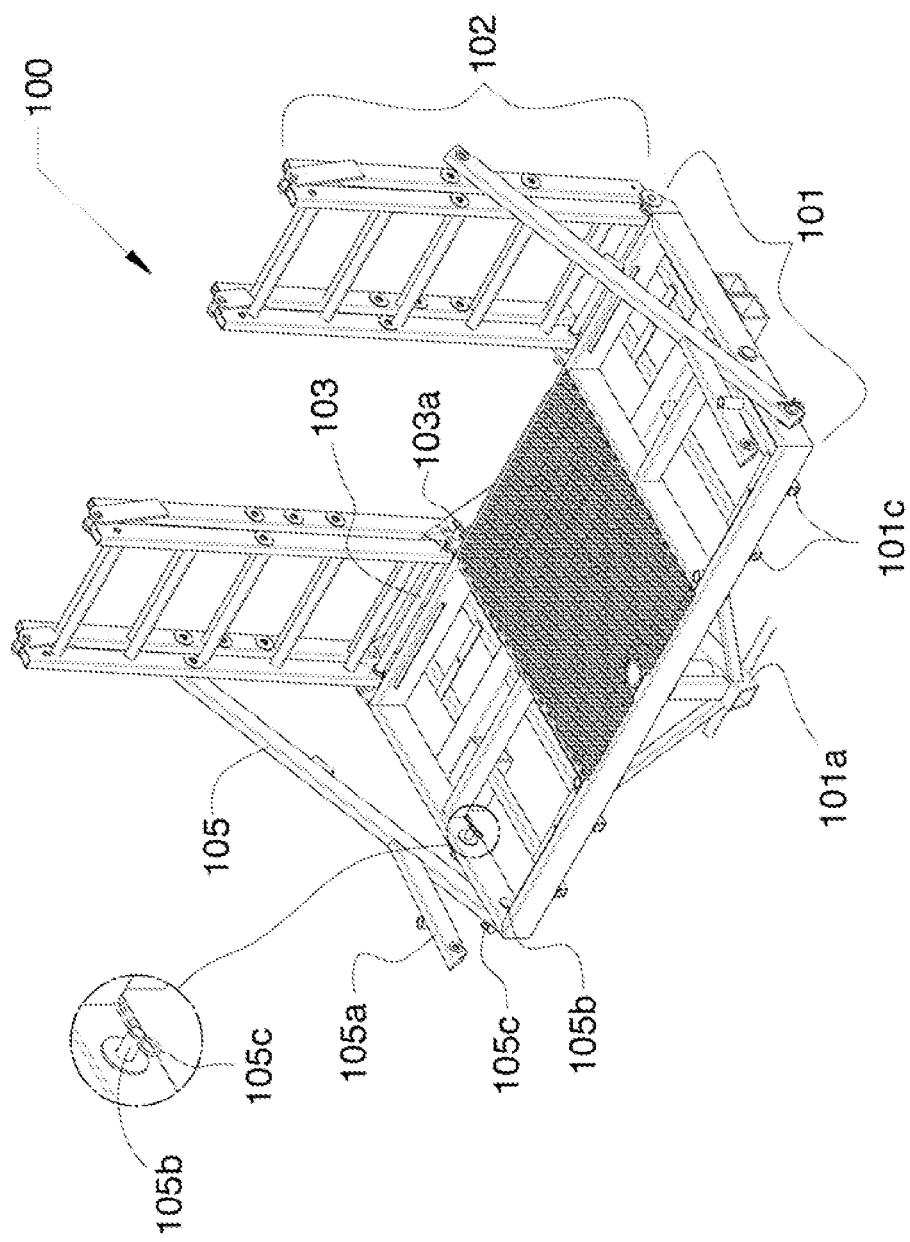
FIG. 13 illustrates a front, perspective view of the multi-functional vehicular ramp by itself with the support posts rotated and supporting the foldable ramp members in the retracted position.
Figure 14:
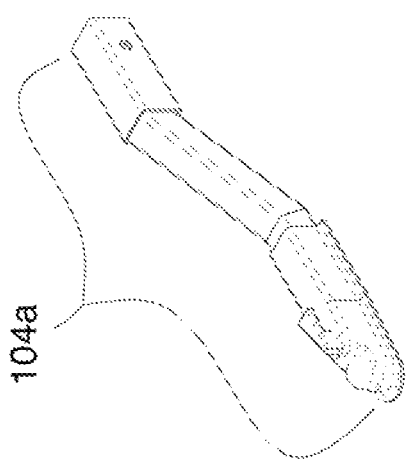
FIG. 14 illustrates multiple trailer hitch receiver adaptors that may be employed by the multi-functional vehicular ramp in use as a trailer.
Figure 15:
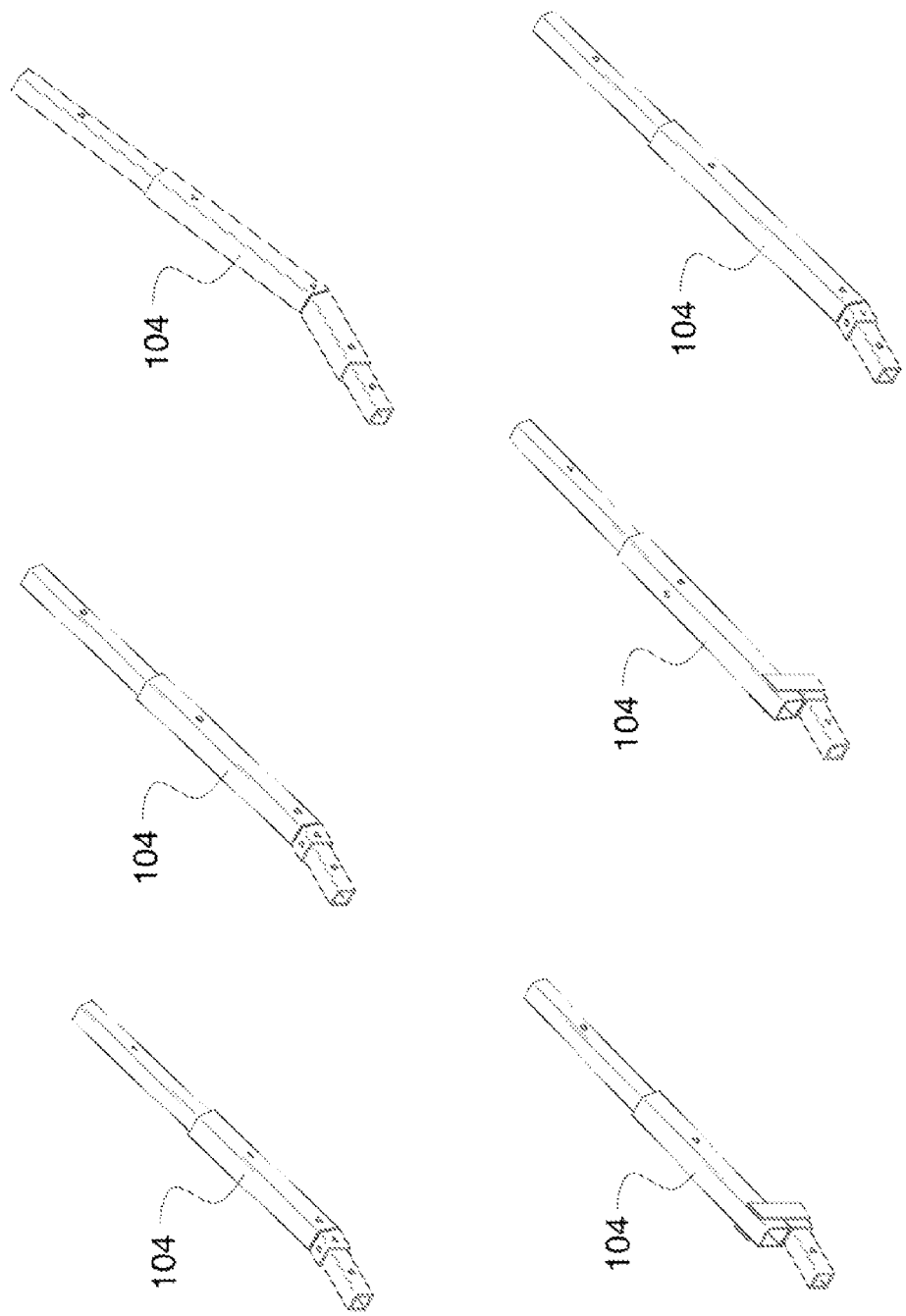
FIG. 15 illustrates multiple trailer hitch adaptors that may be employed by the multi-functional vehicular ramp in use as a pickup truck bed extender.
Figure 18:
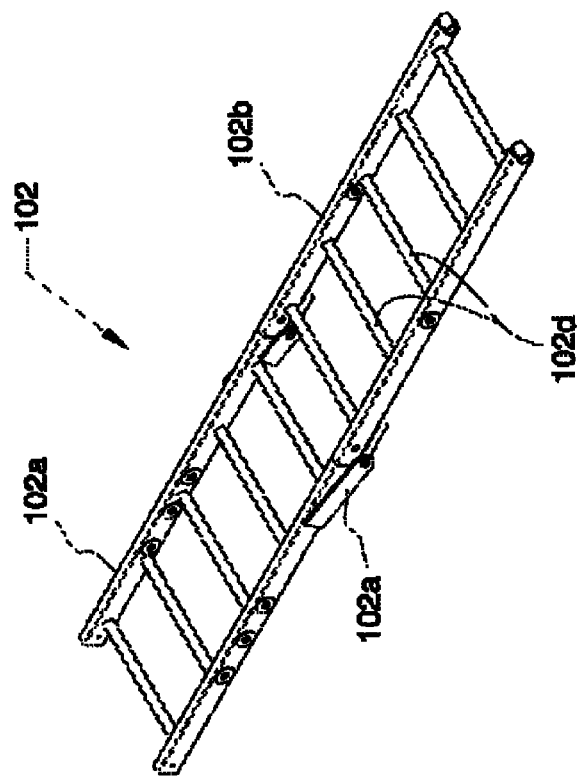
FIG. 18 illustrates a perspective view of the foldable ramp member by itself and in an extended position.
Figure 17:
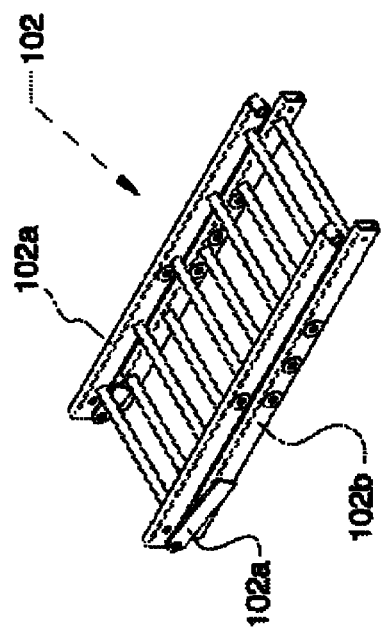
FIG. 17 illustrates a perspective view of the foldable ramp member by itself and in a folded position.
Figure 19:
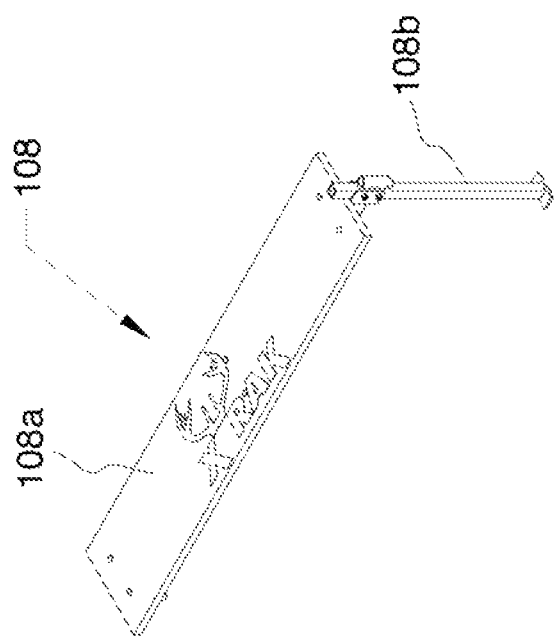
FIG. 19 illustrates a perspective view of a bench member by itself.

Referring to FIG. 13, the base frame 101 is provided a top, perspective view in which longitudinal members 101C and a central plate 101D are more clearly visible. The longitudinal members 101C and the central plate 101D provide surfaces upon which the wheeled object 140 may roll across when using the invention 100 as a ramp or in order to support objects thereon when using the invention 100 as a trailer.

Figure 21:
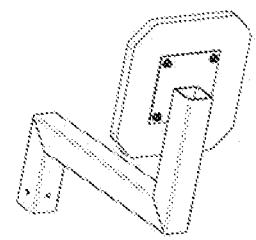
FIG. 21 illustrates a second, perspective view of the seat member from a bottom view so as to illustrate the construction of the seat member.
Figure 20:
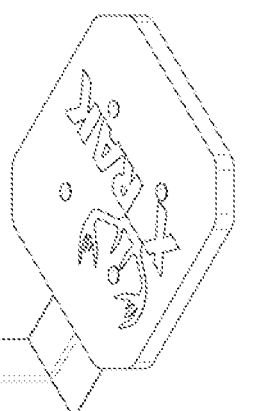
FIG. 20 illustrates a perspective view of a seat member by itself.

Referring to FIGS. 20-21, a seat member 109 may be included with the invention 100 and connected to the angled hitch member 101A of the base frame 101 in order to provide a seating surface with respect to the support frame 101.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A multi-functional vehicular ramp comprising: a base frame from which a plurality of foldable ramp members attach to and extend;
wherein the base frame attaches to a trailer hitch socket via an adaptor and angled hitch support in order to support the base frame at a gap and elevation equal to a truck bed;
wherein the foldable ramp members extend down to act as a ramp for providing ingress and egress of at least one wheeled object to and from said truck bed;
at least one strap attached to the base frame and extends and attaches to the truck bed for additional support of the multi-functional vehicular ramp;
support posts attached on opposing sides of the base frame and support the base frame with respect to the ground or to support the foldable ramp members when retracted;
wherein the multi-functional vehicular ramp is modified for use as a picnic table by rotating the foldable ramp members under the base frame while using the support posts at a vertical orientation thereon;
bench members attached to the support posts via brackets; wherein each bench member includes a horizontal seating surface that attaches between the bracket and a vertical support member;
wherein the vertical support member is adjustably engaged with respect to the horizontal seating surface.

2. The multi-functional vehicular ramp as described in claim 1 wherein the foldable ramp members are generally parallel with respect to one another and provide a means to enable the wheeled object to drive upon the base frame.

3. The multi-functional vehicular ramp as described in claim 2 wherein the foldable ramp members each include a locking hinge that enables rotation of a first member with respect to a second member; wherein the locking hinge enables the foldable ramp member to lock in an extended position; wherein both the first member and the second member each have rungs equally spaced thereon.

4. The multi-functional vehicular ramp as described in claim 3 wherein the support posts each feature an angled member that extends from the support post to form a "Y" shape.

5. The multi-functional vehicular ramp as described in claim 4 wherein a cross-brace attaches to opposing first members of the foldable ramp members; wherein the cross-brace enables an object to be suspended above the ground.

6. The multi-functional vehicular ramp as described in claim 5 wherein wheel assemblies are included and attach to opposing sides of the base frame such that the multi-functional vehicular ramp is used as a trailer.

7. The multi-functional vehicular ramp as described in claim 6 wherein the base frame includes a lateral member that enables attachment of the wheel assemblies thereon; wherein the wheel assemblies each include a wheel, a rotating hub, an axle, and an adaptor.

8. The multi-functional vehicular ramp as described in claim 7 wherein a second adaptor is included to attach the angled hitch member of the base frame to a trailer hitch ball located on a vehicle.

9. The multi-functional vehicular ramp as described in claim 7 wherein a second adaptor is included to attach the angled hitch member of the base frame to an ATV when used as a trailer.

10. A multi-functional vehicular ramp comprising: a base frame from which a plurality of foldable ramp members attach to and extend; wherein the base frame is further composed of an angled hitch support, lateral members, longitudinal members, and a central plate; wherein the base frame attaches to a trailer hitch socket via an adaptor attached to said angled hitch support in order to support the base frame at a gap and elevation equal to a truck bed; at least one strap attached to the base frame and extends and attaches to the truck bed for additional support of the multi-functional vehicular ramp; wherein the foldable ramp members extend down to act as a ramp for providing ingress and egress of at least one wheeled object to and from said truck bed; support posts attached on opposing sides of the base frame and support the base frame with respect to the ground or to support the foldable ramp members when retracted; wherein the multi-functional vehicular ramp is modified for use as a picnic table by rotating the foldable ramp members under the base frame while using the support posts at a vertical orientation thereon; bench members attached to the support posts via brackets; wherein each bench member includes a horizontal seating surface that attaches between the bracket and a vertical support member; wherein the vertical support member is adjustably engaged with respect to the horizontal seating surface.

11. The multi-functional vehicular ramp as described in claim 10 wherein the foldable ramp members are generally parallel with respect to one another and provide a means to enable the wheeled object to drive upon the base frame.

12. The multi-functional vehicular ramp as described in claim 11 wherein the foldable ramp members each include a locking hinge that enables rotation of a first member with respect to a second member; wherein the locking hinge enables the foldable ramp member to lock in an extended position; wherein both the first member and the second member each have rungs equally spaced thereon; wherein the support posts each feature an angled member that extends from the support post to form a "Y" shape.

13. The multi-functional vehicular ramp as described in claim 12 wherein a cross-brace attaches to opposing first members of the foldable ramp members; wherein the cross-brace enables an object to be suspended above the ground.

14. The multi-functional vehicular ramp as described in claim 12 wherein wheel assemblies are included and attach to opposing sides of the base frame via the lateral members such that the multi-functional vehicular ramp is used as a trailer.

15. The multi-functional vehicular ramp as described in claim 14 wherein a second adaptor is included to attach the angled hitch member of the base frame to a trailer hitch ball located on a vehicle or to an ATV when used as a trailer.

* * * * *